United States Patent Office 3,780,034
Patented Dec. 18, 1973

3,780,034
PROCESS FOR PREPARING SUBSTITUTED CEPHALOSPORINS
Burton G. Christensen, Scotch Plains, and Raymond A. Firestone, Fanwood, N.J., assignors to Merck & Co., Inc., Rahway, N.J.
No Drawing. Filed Nov. 29, 1971, Ser. No. 203,052
Int. Cl. C07d 99/16, 99/24
U.S. Cl. 260—243 C          9 Claims

ABSTRACT OF THE DISCLOSURE

A process for preparing 7-acylamino-7-methoxy cephalosporins is provided which comprises oxidizing a 7-substituted ethylideneamino-7 - methoxy cephalosporin. The final compounds have antibacterial activity.

---

This invention relates to a process for preparing a compound of the formula:

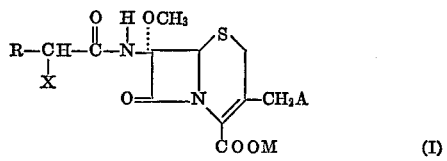

wherein X is hydrogen, amino, or carboxyl; R is phenyl or a 5-membered heterocyclic ring having 1–2 hetero atoms, the latter being either S, O, or N; A is hydrogen, loweralkanoyloxy, carbamoyloxy, thiocarbamoyloxy, N-loweralkylcarbamoyloxy, N-loweralkylthiocarbamoyloxy, N,N-diloweralkylcarbamoyloxy, N,N-diloweralkyl, thiocarbamoyloxy, pyridinium, alkylpyridinium, halopyridinium, or aminopyridinium; and M is sodium, potassium, benzyl, benzhydryl, trimethylsilyl, trichloroethyl, methoxymethyl, hydrogen, benzoylmethyl, or methoxybenzyl.

In summary, this invention provides a route for oxidizing a compound of the formula:

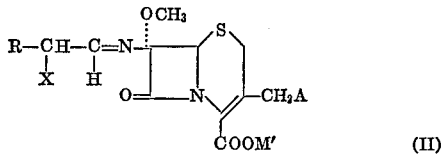

wherein R, X, and A are as defined above, and M' is benzyl, benzhydryl, trimethylsilyl, trichloroethyl, methoxymethyl, benzoylmethyl, or methoxybenzyl.

The compounds which are used as the starting materials, Compound II, above, are prepared by reacting a 7-methoxy-7-aminocephalosporin, III,

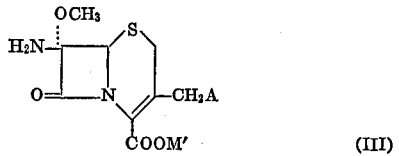

with a substituted acetaldehyde, IV,

wherein A, M', R, and X in Formulas III and IV are the same as defined above. It will be appreciated that the necessary substituted acetaldehyde IV are well known in the art, or can be prepared easily using methods familiar to those skilled in the art. The 7-methoxy-7-aminocephalosporins III do not form a part of this invention, but can be prepared using preparative methods described in more detail within this specification. The reaction of III and IV yields a Schiff's base type compound, II, which can generically be classed as a 7-substituted ethylideneamino-7-methoxycephalosporin. This process takes place quickly after combining the two reactants in approximately equimolar proportions in a solvent inert to the reactants, preferably at reflux for a brief period, generally within 1–2 hours.

The Schiff's base Compound II is prepared quantitatively and can be used in the inventive process without exhaustive purification. Removal of the solvent, as by evaporation, is all that is necessary as preparative treatment.

The process of this invention utilizes the starting material II in reaction with an oxidizing agent.

The starting material II can also be prepared by starting with a 7-aminocephalosporin which does not possess the 7-methoxy substituent. In this case, the 7-aminocephalosporin is first reacted with the substituted acetaldehyde IV, thereby preparing a Schiff's base-type compound. This latter is then lithiated and methoxylated using procedures substantially identical to those described herein in the preparative examples. It is noted that this alternate route does not form a part of this invention but is disclosed and claimed in a copending application. It will be recognized that which ever route is used, the product II is used as described in the examples herein.

There are two oxidizing agents employed in the reaction; each has a different set of reaction conditions. One useful oxidizing agent is chromylchloride ($CrO_2Cl_2$). This latter compound is employed in approximately equimolar amount to the starting material II, or can also be employed in molecular excess, up to about 1½ excess. The reaction takes place in an inert solvent, such as chloroform or methylene chloride. The temperature is about 0° C. and operably is between −10° C. and 5° C. The reaction takes place within 12–36 hours after the two reactants are mixed. The reaction mixture is then washed and purified using art-recognized procedures.

The second useful oxidizing agent is m-chloroperbenzoic acid, although other peracids can be used. This oxidizing process takes place in two steps; the first is the oxidation, and the second is a thermal rearrangement. Approximately equimolar amounts are used of the starting material and the oxidizing agent, although the oxidizing agent can be used in excess. The reaction proceeds quickly and is essentially complete within 1–10 hours, at approximately ambient temperatures in an inert solvent such as methylene chloride or the like. This reaction mixture is then treated with a compound capable of deactivating the oxidizing agent, such as sodium sulfite. After washing and drying, the residue is then added to a solvent such as acetonitrile and refluxed for 12–36 hours. The solvent is then removed, as by evaporation, and a small amount of acetic anhydride added. This solution is warmed carefully until reaction occurs, then cooled. The mixture is then worked up using art-recognized processes to yield the desired product.

The compounds prepared by the process of this invention are useful as antibacterial agents against both gram-positive and gram-negative bacteria. In addition, resistance to β-lactamases has been demonstrated. The activity spectrum includes effectiveness against many bacteria, including in vivo on *Proteus morganii*, and, in addition, against *E. coli*, *P. vulgaris*, *P. mirabilis*, *S. schottmuelleri*, *K. pneumoniae* AD, *K. pneumoniae* B, and *P. arizoniae*.

In addition to the specific end product as defined in structural Formula I, other compounds which are active antibacterials can also be prepared using the process described herein. The compounds which can be prepared have the following structural formula:

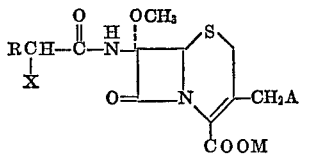

(V)

It is noted that the analogous Δ² compounds can also be prepared using the processes described herein are valuable intermediate compounds because of their greater acid stability and can be converted to Δ³ compounds easily. The various substituents of Formula V have the following meanings: X is hydrogen, halo, amino, guanidino, phosphono, hydroxy, tetrazolyl, carboxyl, sulfo, or sulfamino;

R is phenyl, substituted phenyl, a monocyclic heterocyclic 5- or 6-membered ring containing one or more oxygen, sulfur, or nitrogen atoms in the ring, substituted heterocycles, phenylthio, heterocyclic, or substituted heterocyclic thio-groups, or cyano; the substituents on the R group being halo, carboxymethyl, guanidino, guanidinomethyl, carboxamidomethyl, aminomethyl, nitro, methoxy, or methyl;

A is hydrogen, hydroxy, halo, mercapto, cyano, alkanoyloxy, alkanoylthio, aroyloxy, aroylthio, heteroaryloxy or heteroarylthio, the hetero ring having 5–6 members and having 1–3 hetero atoms, being O, S, or N or combinations thereof, azido, amino, carbamoyloxy, alkoxy, alkylthio, carbamoylthio, thiocarbamoyloxy, benzoyloxy, (p-chlorobenzoyl)oxy, p - methylbenzoyl)oxy, pivaloyloxy, (1-adamantyl)carboxy, substituted amino such as alkylamino, dialkylamino, alkanoylamino, carbamoylamino, N-(2-chloroethylamino), 5-cyano-triazol-1-yl, 4-methoxycarbonyl-triazol-1-yl, or quaternary ammonium such as pyridinium, 3-methylpyridinium, 4-methylpyridinium, 3-chloropyridinium, 3-bromopyridinium, 3-iodopyridinium, 4-carbamoylpyridinium, 4 - (N-hydroxymethylcarbamoyl)pyridinium, 4 - (N-carbomethoxycarbamoyl)pyridinium, 4 - (N-cyanocarbamoyl)pyridinium, 4-(carboxymethyl)pyridinium, 4 - (hydroxymethyl)pyridinium, 4-(trifluoromethyl)pyridinium, quinolinium, picolinium, or lutidinium; N-loweralkylcarbamoyloxy, N,N-diloweralkylthiocarbamoyloxy, alkanoylcarbamoyloxy, hydroxyphenyl, sulfamoyloxy, alkylsulfonyloxy, or (cis-1,2-epoxypropyl)phosphono; and M is an alkali metal, benzyl, alkanoyloxymethyl, alkylsilyl, phenalkanoyl, benzhydryl, alkoxyalkyl, alkenyl, trichloroethyl, hydrogen, benzoylmethyl, or methoxybenzyl;

Preferably in the compounds of Formula V, X is hydrogen, amino or carboxyl, R is phenyl, or a 5–6 membered heterocyclic ring having 1–2 heteroatoms, the latter being either S, O, or N;

A is hydrogen, halo, azido, cyano, hydroxy, alkoxy, carbamoyloxy, thiocarbamoyloxy, N-loweralkylcarbamoyloxy, N,N-diloweralkylcarbamoyloxy, N - loweralkylthiocarbamoyloxy, N,N - diloweralkylthiocarbamoyloxy, alkanoyloxy, aroyloxy, mercapto, alkylthio, amino, alkylamino, alkanoylamino, hydroxyphenyl, sulfamoyloxy, quaternary ammonium, alkylsulfonyloxy, or (cis-1,2-epoxypropyl)phosphono; and M is alkali metal, benzyl, alkylsilyl, phenalkanoyl, alkoxyalkyl, pivaloyloxymethyl, alkenyl, trichloroethyl, hydrogen, benzoylmethyl, or methoxybenzyl.

Even more preferably, X is hydrogen, amino, or carboxyl; R is phenyl or a 5-membered heterocyclic ring having 1–2 hetero atoms, the latter being either S, O, or N;

A is hydrogen, loweralkanoyloxy, heteroarylthio, carbamoyloxy, thiocarbamoyloxy, N-loweralkylcarbamoyloxy, N-loweralkylthiocarbamoyloxy, N,N-diloweralkylcarbamoyloxy, N,N-diloweralkylthiocarbamoyloxy, pyridinium, alkylpyridinium, halopyridinium, or aminopyridinium; and M is sodium, potassium, benzyl, benzyhydryl, trimethylsilyl, trichloroethyl, methoxymethyl, hydrogen, benzoylmethyl, or methoxybenzyl.

Still more preferably, X is hydrogen or carboxyl;
R is phenyl, or a 5-membered heterocyclic ring having one O or one S hetero atom;

A is hydrogen, loweralkanoyloxy, carbamoyloxy, N-loweralkylcarbamoyloxy, N,N - diloweralkylcarbamoyloxy, pyridinium, alkylpyridinium, halopyridinium, or aminopyridinium; and M is sodium, potassium, benzhydryl, methoxymethyl, or hydrogen.

Most preferably, X is hydrogen or carboxyl;
R is phenyl, thienyl, or furyl;
A is hydrogen, loweralkanoyloxy, carbamoyloxy, or pyridinium; and
M is sodium, potassium, benzhydryl, methoxymethyl, or hydrogen.

In addition, compounds of Formula V above wherein the sulfur atom is present as the sulfoxide

can be prepared in this inventive reaction. It will also be apparent that the process described herein can also be used to prepare analogous compounds in the penicillin series, viz.:

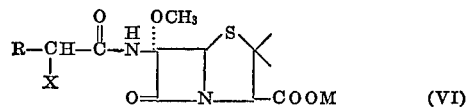

(VI)

wherein X, A, and M are the same as defined in Formula V.

The compounds of Formula V can generally be prepared from 7–ACA or known derivatives thereof using the general process outlined in the preparative examples.

The blocking group on the acid functionality at position-4 of the cephalosporin ring can be removed following any of the reactions of this invention. The removal can be accomplished using methods available to those in the art.

The penicillins of Formula VI can be prepared from 6–APA using procedures analogous to those described for the cephalosporins.

The starting materials useful in the application of these inventive reactions to prepare the compounds described in Formula III can be prepared in accordance with known methods, see, e.g., Belgium Pat. 650,444 or U.S. Pat. 3,117,126, or using the following preparations.

The term "loweralkyl" is employed to mean a carbon chain having 1–6 carbon atoms, when more than one loweralkyl group appears in a substituent. The groups can be the same or different.

PREPARATION 1

3-hydroxymethyl-7-aminodecephalosporanic acid

The 3-hydroxymethyl-7-aminodecephalosporanic acid is obtained as the lactone by acid hydrolysis of cephalosporin C in accordance with procedures known in this art.

PREPARATION 2

3-pyridiniummethyl-7-aminodecephalosporanic acid

This compound is prepared by treating cephalosporin C with pyridine followed by acid hydrolysis as described in U.S. Pat. 3,117,126.

PREPARATION 3

-3chloromethyl-7-aminodecephalosporanic acid

This compound is prepared from cephalosporin C by catalytic reduction followed by hydrolytic removal of the 5-aminodipoyl side chain as described in U.S. Pat. 3,129,-224.

PREPARATION 4

3-chloromethyl-7-aminodecephalsoporanic acid

This compound is prepared from the 3-methyl compound by reaction with chlorine gas. The bromomethyl or iodomethyl derivatives can be prepared from the 3-hydroxymethyl compound by reaction with phosphorus tribromide or phosphorus triiodide, respectively.

The starting materials used in the preparation of the compounds of Formula I can be prepared as follows:

PREPARATION 5

3-carbamoyloxymethyl-7-aminodecephalosporanic acid 7-aminocephalosporanic acid is treated with t-butoxycarbonylazide to produce the 7β-(t-butoxycarbonyl) derivative in accordance with known methods. This derivative is then intimately contacted with citrus acetylesterase in aqueous phosphate buffer at pH 6.5–7 for 15 hours and 3-hydroxymethyl 7β-(t-butoxycarbonyl)aminodecephalosporanic acid is recovered from the resulting reaction mixture.

To 0.2 g. of 3-hydroxymethyl 7β-(t-butoxycarbonyl) aminodecephalosporanic acid suspended in 5 ml. of acetonitrile, cooled to 0° C. and maintained under nitrogen atmosphere is added 0.15 ml. of chlorosulfonyl isocyanate. The reaction mixture is stirred for 70 minutes and then evaporated under diminished pressure to dryness. The resulting residue is taken up in 10 ml. of ethylacetate and 10 ml. of 0.1 N phosphate buffer. The pH of the aqueous layer is adjusted to about 1.6 and the mixture stirred for 2½ hours at room temperature. The pH is then adjusted to about 8 with aqueous tripotassium phosphate solution, and the aqueous phase is separated. The organic phase is re-extracted with 10 ml. of phosphate buffer at pH 8. The combined aqueous phase is adjusted to pH 2.1 with hydrochloric acid and extracted twice with ethylacetate. The ethylacetate extractions are dried over sodium sulfate and evaporated under diminished pressure to afford 0.055 g. of residue. This residue is washed with ether to afford 3-carbamoyloxymethyl - 7β - (t - butoxycarbonyl) - aminodecephalosporanic acid which is recovered as a yellow solid.

3 - carbamoyloxymethyl - 7β - (t - butoxycarbonyl)-aminodecephalosporanic acid (0.5 g.) in 3.5 ml. of anisole is stirred with 2 ml. of trifluoroacetic acid at 0° C. for 5 minutes. The resulting reaction mixture is evaporated under reduced pressure to afford 3-carbamoyloxymethyl-7-aminodecephalosporanic acid which is purified further by crystallization from ethylacetate.

PREPARATION 6

Trimethylsilyl 3-carbamoyloxymethyl-7-aminodecephalosporanate

A mixture of 0.5 mg. of 3-carbamoyloxymethyl-7-aminodecephalosporanic acid, 2 ml. of hexamethyldisilazane and 8 ml. of chloroform is stirred overnight at reflux temperature protected from moisture. The solvent and excess hexamethyldisilazane are removed at reduced pressure, leaving a residue containing trimethylsilyl-3-carbamoyloxymethyl-7-aminodecephalosporanate.

PREPARATION 7

Benzhydryl 7-amino-7-methoxy-3-carbamoyloxymethyldecephalosporanate (A) 7 - amino - 3 - carbamoyloxymethyldecephalosporanic acid benzhydryl ester: 272 mg. of 7-amino-3-carbamoyloxymethyldecephalosporanic acid is slurried 5 min. at 25° C. in 7 ml. dioxane with 170 mg. p-toluenesulfonic acid.H$_2$O. Methanol (2 ml.) is added, the solvents are removed in vacuo, and dioxane is twice added and evaporated in vacuo. Dioxane (8 ml.) is added, and then 290 mg. diphenyldiazomethane. After the evolution of nitrogen is complete, the solvent is distilled in vacuum, and the residue stirred with methylene chloride (10 ml.) and water (10 ml.) containing sufficient K$_2$HPO$_4$ to bring the pH to 8. The layers are separated and the aqueous portion extracted twice more with CH$_2$Cl$_2$. The combined organic layers are dried with sodium sulfate, filtered and evaporated, leaving oily crystals. Washing with ether affords a dry solid, 150 mg. (35%), M.P. 110–115° C. which is the product, 7-amino-3-carbamoyloxymethyldecephalosporanic acid benzhydryl ester.

In a like manner, the benzhydryl and other esters of 3-methyl-7-aminodecephalosporanic acid, 3-chloromethyl-7-aminodecephalosporanic acid, and 7-aminocephalosporanic acid can be prepared.

(B) 7-(benzylideneamino) - 3 - carbamoyloxymethyldecephalosporanic acid benzhydryl ester: The 7-amino-3-carbamoyloxymethyldecephalosporanic acid benzhydryl ester, as prepared in Step A, 439 mg., is refluxed one hour in 50 ml. benzene with 106 mg. benzaldehyde in an azeotropic drying apparatus. The solvent is vacuum distilled away, leaving 527 mg. of product which is used in the next step without further purification. Samples which are identified show the structure to be the 7-(benzylideneamino) - 3 - carbamoyloxymethyldecephalosporanic acid benzhydryl ester.

The other esters prepared in Step A can also be reacted to form the imino derivatives of the above procedure.

(C) Benzhydryl 3-carbamoyloxymethyl - 7 - methoxy-7 - benzylideneaminodecephalosporanate: Benzhydryl 7-(benzylideneamino) - 3 - carbamoyloxymethyldecephalosporanate, 527 mg., is dissolved in 20 ml. dry tetrahydrofuran. At −78° C., under nitrogen, 0.435 ml. of 2.3 M phenyl lithium is added. The reaction mixture is allowed to rise in temperature to −50° C. The intermediate compound, benzhydryl 3-carbamoyloxymethyl-7-benzylideneamino-7-lithiodecephalosporanate is thereby prepared but is not isolated or further characterized. It is identified by the presence of an intense orange-brown coloration in the reaction mixture.

The reaction mixture is then brought to 0° C. and stirred with 62 mg. of bis(methyl)peroxide; the reaction mixture is allowed to warm to room temperature for a one-hour period. 150 ml. of benzene containing 0.1 ml. acetic acid is added, and the solution is washed three times with water, dried over MgSO$_4$, filtered and evaporated, yielding benzhydryl 3-carbamoyloxymethyl-7-methoxy-7-benzylideneaminodecephalosporanate.

(D) Benzhydryl 3-carbamoyloxymethyl - 7 - methoxy-7-aminodecephalosporanate: A solution of benzhydryl 3-carbamoyloxymethyl-7-methoxy - 7 - benzylideneaminodecephalosporanate (304 mg.) in 3 ml. of ethanol and 0.5 ml. of methylene chloride is added to a solution of 100 mg. of powdered 2,4-dinitrophenyl hydrazine, 85.5 mg. of p-toluenesulfonic acid monohydrate, and 3 ml. of absolute alcohol.

The mixture is stirred for 30 minutes, filtered and after the filter cake has been thoroughly washed with ethanol, the filtrates are evaporated under reduced pressure at or below ambient temperature. The resultant solid is washed several times with ether and dried in a nitrogen stream. This solid is the benzhydryl 7-methoxy-7-amino-7-aminocephalosporanate tosylate salt.

The tosylate salt is converted to the free amine using the following procedure:

A mixture of 3.5 ml. of ether, 0.5 ml. of ethyl acetate, 2 ml. of water and 22 mg. of dipotassium hydrogen phosphate is prepared. To this is added 100 mg. of benzhydryl 7-methoxy-7-aminocephalosporanate tosylate salt and the mixture is shaken vigorously for several minutes. After phase separation the aqueous phase is again extracted with ether, the combined organic phases are dried over anhydrous magnesium sulfate, and evaporated to a gum under reduced pressure. The product is flushed several times by dissolving it in a small volume of chloroform and again evaporating to a gum under high vacuum. The product so obtained exhibits IR and NMR spectra consistent with the assigned structure for benzhydryl 7-methoxy-7-aminocephalosporanate.

PREPARATION 8

Benzhydryl 3-carbamoyloxymethyl-7-amino-7-methoxydecephalosporanate (A) Benzhydryl 3-carbamoyloxymethyl - 7 - diazo-decephalosporanate: To 2 g. of sodium nitrite, 40 ml. of methylene chloride and 40 g. of ice, in a separatory funnel, is added 1.32 g. (0.003 mole) of benzhydryl 3-carbamoyloxymethyl-7-aminodecephalosporanate. The mixture is vigorously shaken and then 1.14 g. (0.006 mole) of p-toluenesulfonic acid is added in 3 equal amounts over 15 minutes while the shaking is continued. After shaking another 5 minutes, the organic phase is separated, washed once with water, dried over sodium sulfate at 0° C., filtered and evaporated under vacuum below room temperature to afford benzhydryl 3-carbamoyloxymethyl-7-diazodecephalosporanate.

(B) Benzhydryl 3 - carbamoyloxymethyl-7-bromo-7-azidodecephalosporanate: To a solution of 0.900 g. of benzhydryl 3-carbamoyloxymethyl - 7 - diazodecephalosporanate in 30 ml. of methylene chloride at 0° C. is added a solution of triethylammonium azide prepared as described below followed by the addition of a solution of bromine azide also prepared as described below. The mixture is stirred at 0° C. for 5 more minutes or until $N_2$ evolution stops. Sodium bicarbonate (50 ml.; 5%) is added. The organic phase is separated and washed twice with 20 ml. of water, dried over anhydrous sodium sulfate, filtered and evaporated. Chromatography on silica gel affords the benzhydryl 3-carbamoyloxymethyl-7-bromo-7-azidodecephalosporanate.

The solution of bromine azide is prepared by mixing 2.4 g. of sodium azide in 4 ml. of water and 40 ml. of methylene chloride. The solution is cooled to −5° C. and 4 ml. of 50% v./v. sulfuric acid is added dropwise over 5 minutes. The mixture is stirred at 0–5° C. for another 5 minutes. The temperature is lowered to −10° C. solidifying the aqueous phase. The methylene chloride layer is poured off, dried over anhydrous sodium sulfate, and divided into two equal 20 ml. portions. To one of the 20 ml. portions is added 1 g. of N-bromosuccinimide and the mixture is stirred at 0–10° C. until the N-bromosuccinimide dissolved to afford the bromine azide solution.

The solution of triethylammonium azide is prepared by adding 0.8 ml. of triethylamine to the other 20 ml. of portion of hydrogen azide solution.

(C) Benzhydryl 3-carbamoyloxymethyl - 7 - methoxy-7-azidodecephalosporanate: To a solution of 0.410 g. of benzhydryl 3-carbamoyloxymethyl-7-bromo - 7 - azido-decephalosporanate in 30 ml. of methanol is added 0.150 g. of silver fluoroborate. The mixture is stirred in the dark for 2½ hours and the solvent is removed under vacuum. The residue is taken up in 50 ml. of methylene chloride and washed twice with a saturated solution of sodium bicarbonate, twice with water, dried over anhydrous magnesium sulfate and evaporated to afford benzhydryl 3-carbamoyloxymethyl - 7 - methoxy-7-azidodecephalosporanate.

(D) Benzhydryl 3-carbamoyloxymethyl - 7 - amino-7-methoxydecephalosporanate: Benzhydryl 3 - carbamoyloxymethyl - 7 - azido - 7 - methoxy-decephalosporanate (0.25 g.) is dissolved in 25 ml. of dioxane. 0.250 gram of platinum oxide is added and the reaction mixture is reduced again for three hours until the azide is completely reacted as determined by infrared analysis of aliquots. The solvent is removed under reduced pressure and the residue taken up in chloroform (15 ml.) and filtered through a small column of silica gel-G in chloroform. The column is eluated with chloroform until 60 ml. of chloroform are collected. The chloroform is removed under reduced pressure to afford benzhydryl 3-carbamoyloxymethyl - 7 - amino - 7 - methoxydecaphalosporanate.

PREPARATION 9

Benzhydryl 7-(2-[2-thienyl]ethylideneamino)-7-methoxy-3-carbamoyloxymethyldecephalosporanate The compound, benzhydryl 3-carbamoyloxymethyl-7-methoxy - 7 - aminodecephalosporanate (439 mg.) is refluxed with 126 mg. of 2-(2-thienyl)acetaldehyde in 50 ml. benzene for one hour under an azeotropic water separator. Evaporation of the solvent leaves crude benzhydryl 7-(2-[2-thienyl]ethylideneamino) - 7 - methoxy-3-carbamoyloxymethyldecephalosporanate, about 547 mg., which can be used without further purification in the following examples.

EXAMPLE 1

Benzhydryl 3-carbamoyloxymethyl-7-(2-thienylacetamido)-7-methoxydecephalosporanate The compound benzhydryl 3 - carbamoyloxymethyl-7-(2-[2-thienyl]ethylideneamino) - 7 - methoxydecephalosporanate and freshly prepared chromyl chloride $$(CrO_2Cl_2)$$

(1:1.5 molar ratio) are allowed to react for 24 hours at −5° C. in chloroform. The solution is then washed with aueous pH 8 phosphate buffer, dried with $MgSO_4$, filtered and evaporated to afford the crude product, benzhydryl 3-carbamoyloxymethyl-7-(2-thienylacetamido)-7-methoxydecephalosporanate. The pure compound can be obtained by preparative chromatography on silica gel, eluting with 4:1 chloroform:ethylacetate.

EXAMPLE 2

Benzhydryl 3-carbamoyloxymethyl-7-(2-thienylacetamido)-7-methoxydecephalosporanate The compound benzhydryl 3 - carbamoyloxymethyl-7-(2-[2-thienyl]ethylideneamino) - 7 - methoxydecephalosporanate (577 mg.) is treated for one hour in 25 ml. methylene chloride at 25° C. with 173 mg. m-chloroperbenzoic acid. The solution is filtered, washed with dilute aqueous sodium sulfite, and then aqueous pH 8 phosphate. The solution is dried with $MgSO_4$, filtered, evaporated, taken up in 25 ml. dry acetonitrile, and refluxed 24 hours. The acetonitrile is evaporated, and replaced with 3 ml. acetic anhydride. The solution is warmed carefully until reaction occurs, cooled immediately, evaporated at 25° C./0.1 mm. Hg., taken up in 24 ml. benzene, and shaken with aqueous pH 8 phosphate buffer to hydrolyze remaining acetic anhydride. After drying with $MgSO_4$, filtration and evaporation of the solvent, the crude product benzhydryl 3-carbamoyloxymethyl - 7 - (2-thienylacetamido)-7-methoxydecephalosporanate is obtained. This product can be purified as in Example 1.

What is claimed is:

1. The process of preparing a compound of the formula:

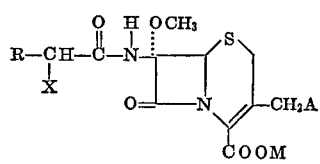

wherein X is hydrogen, amino, or carboxyl; R is phenyl, thienyl or furyl; A is hydrogen, loweralkanoyloxy, carbamoyloxy, thiocarbamoyloxy, N-loweralkylcarbamoyloxy, N-loweralkylthio, carbamoyloxy, N,N-diloweralkylcarbamoyloxy, N,N-diloweralkylthiocarbamoyloxy, pyridinium, alkylpyridinium, halopyridinium, or aminopyridinium; and M is sodium, potassium, benzhydryl, trimethylsilyl, trichloroethyl, methoxymethyl, hydrogen, benzoylmethyl, or methoxybenzyl; which comprises oxidizing a compound of the formula:

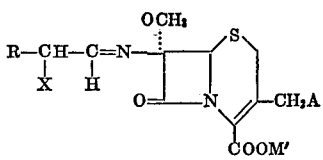

wherein R, X, and A are the same as above, and M' is benzhydryl, trimethylsilyl, trichloroethyl, methoxymethyl, benzoylmethyl, or methoxybenzyl;
  (a) using chromyl chloride in from about an equivalent amount to a molecular excess, at a temperature of between about −10° C. and 5° C.; or
  (b) using m-chloroperbenzoic acid, in from about an equivalent amount to a molecular excess, at ambient temperatures, followed by addition of about an equivalent of sodium sulfite, and refluxing; and then deblocking when M is hydrogen, optionally followed by addition of sodium or potassium hydroxide when M is sodium or potassium.

2. The process of claim 1 in which the oxidizing agent is chromyl chloride.

3. The process of claim 2 in which the chromyl chloride is employed in amounts ranging from approximately equimolar to 1½ times molecular excess, based on the amount of the starting material.

4. The process of claim 3 in which the reaction is conducted at a temperature between −10° C. and 5° C. in an inert solvent, within about 12–36 hours.

5. The process of claim 1 in which the oxidizing agent is m-chloroperbenzoic acid.

6. The process of claim 5 in which the m-chloroperbenzoic acid is employed in amounts ranging from approximately equimolar to 1½ times molecular excess, based on the amount of the starting material.

7. The process of claim 6 in which the reaction is conducted at approximately ambient temperature in an inert solvent, within about 1–10 hours, followed by the addition of acetonitrile, then acetic anhydride, followed by application of heat to yield the desired compound.

8. The process of claim 1 in which R is thienyl, X is hydrogen, and A is carbamoyloxy.

9. The process of claim 1 in which R is phenyl, X is carboxyl, and A is acetoxy.

References Cited

Nagarajan et al.: Jac. S. vol. 93:9 pp. 2308–2312, Map 5, 1971.

NICHOLAS S. RIZZO, Primary Examiner

U.S. Cl. X.R.

260—239.1; 424—246, 271